May 22, 1928.

W. L. OSWALD 1,670,313

SYSTEM OF FLUID PRESSURE REGULATION

Filed Sept. 6, 1923  2 Sheets-Sheet 2

INVENTOR
Walter L. Oswald
BY
Frank H. Hubbard
ATTORNEY

Patented May 22, 1928.

1,670,313

UNITED STATES PATENT OFFICE.

WALTER L. OSWALD, OF MOUNT VERNON, NEW YORK, ASSIGNOR, BY MESNE ASSIGNMENTS TO CUTLER-HAMMER MANUFACTURING COMPANY, A CORPORATION OF NEW YORK.

SYSTEM OF FLUID-PRESSURE REGULATION.

Application filed September 6, 1923. Serial No. 661,170.

My invention relates to systems of fluid pressure regulation and is particularly applicable to pressure regulation of water feed to steam boilers.

Heretofore it has been customary to operate boiler feed pumps by steam turbines utilizing an automatic throttling governor to maintain the water pressure about 25 pounds in excess of the steam pressure in the boiler to be fed. However, there is now a demand for electric motor equipment for this service but owing to the fact that A. C. motors are usually required and to the difficulty of adequately regulating the water pressure through speed regulation of such motors the use of electric motors in this connection has been limited.

The present invention has among its objects to overcome the difficulties heretofore experienced in utilizing electric motors for the aforementioned and similar purposes, and to effect the desired pressure regulation independently of the motor speed.

Another object is to provide a system of pressure regulation whereby the desired pressure difference may be maintained by a valve in the water feed line, the pump motor being operated at constant speed.

Another object is to provide a system whereby pressure regulation may be effected as aforestated, the desired pressure difference being maintained with a high degree of accuracy and reliability.

Various other objects and advantages of the invention will hereinafter appear.

The accompanying drawing illustrates more or less diagrammatically one embodiment of the invention which will now be described, it being understood that this embodiment of the invention is susceptible of various modifications falling within the scope of the appended claims.

Figure 1:
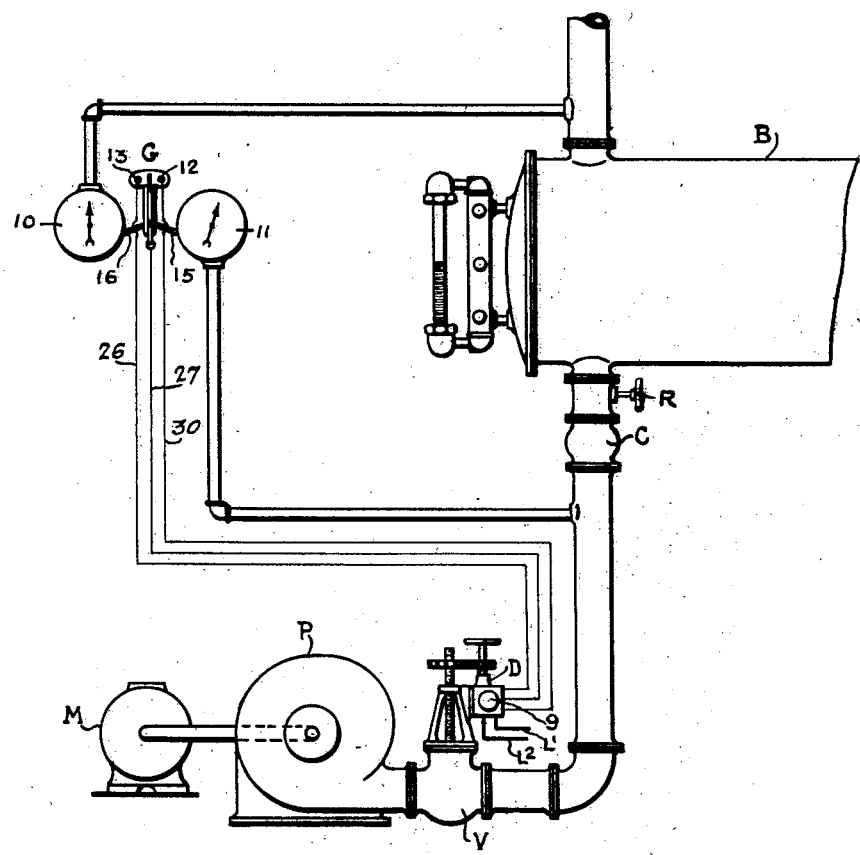
Figure 1 is a diagrammatic view showing the boiler, feed pump, etc.

Referring to Fig. 1, the same shows a boiler B to be fed with water through check valve C by a pump P driven by an electric motor M of any preferred type, said motor being preferably designed for operation at constant speed. A valve V is located in the feed line, said valve to be adjusted to maintain the water pressure in excess of the steam pressure to the desired degree and a motor drive D is provided to so adjust the valve under the control of a pressure gauge G which is sensitive to variations in both steam pressure and water pressure as hereinafter more fully set forth. The water level in boiler B may be regulated by means of the manually operable valve R, or by any suitable or well known type of automatic regulator.

The drive D for the valve is preferably of the type disclosed in the patent of P. P. Dean, No. 1,245,574 granted November 6, 1917, this type of drive including means to effect instantaneous release of the valve from its driving motor when desired, thereby enabling the valve to be quickly arrested in any desired position. More specifically this type of drive as exemplified in Fig. 2 comprises a planetary gear transmission including a pinion $2^a$ driven by the motor 9, as by a shaft 9', a plurality of pinions $2^b$ carried by a spider S fixed to the driven shaft S' and an internally toothed ring 2 which must be restrained to render the drive effective. As illustrated, this ring is provided with a series of external teeth 3 extending around the same to be engaged by a toothed pawl 4. It will thus be observed that the pawl serves to restrain the ring in any rotary position thereof subject to instantaneous release and interruption of the drive upon retraction of the pawl from engagement with the teeth 3. The pawl may be biased toward or away from restraining position as desired, but, as illustrated, it is biased away from restraining position and movable into restraining position by an electromagnet 6 through the medium of a toggle 7 having a spring 8 to collapse the same and hence bias said pawl as stated. With this arrangement the electromagnet 6 may be connected in series with the valve operating motor 9 the armature and series field of which are shown diagrammatically at $a$ and $f$ in Fig. 2 and thus provide for completion of the mechanical drive as an incident to completion of the motor circuit and interruption of said mechanical drive immediately upon interruption of the motor circuit. Accordingly, all tendency to effect overtravel of the valve by the drift of the motor when disconnected from circuit is overcome with the result of enabling quick arrest of the valve in any desired position as aforestated.

The pressure gauge G comprises two Bourdon tube gauges 10 and 11 to be respectively subjected to the steam pressure and the water pressure, and further comprises a contact element 12 operatively connected to the Bourdon tubes to be engaged with co-operating contacts 13 and 14 respectively. The two Bourdon tube gauges are in general of standard form and have their tubes connected to the contact element 12 through toggles 15 and 16, each toggle having at one extremity a fixed pivot within its respective gauge and at its other extremity a sliding connection with said contact element. More specifically, the contact element which is mounted on a pivot 17 has a longitudinally extending slot 18 to receive a pin 19 passing through the adjacent extremities of toggles 15 and 16 whereby upon like adjustments of both toggles the pin 19 will travel in the slot 18 without movement of the element 12 whereas straightening of the toggle 15 independently of toggle 16 will move the element 12 clockwise and straightening of the toggle 16 independently of toggle 15 will move the element 12 counter-clockwise. Hence, assuming gauge 10 to be responsive to steam pressure, an increase in steam pressure will cause clockwise movement of contact element 12 to engage the same with contact 14 and assuming gauge 11 to be responsive to water pressure an increase in water pressure will cause counter-clockwise movement of the element 12 to engage the same with contact 13. On the other hand it will be apparent that a drop in steam pressure will have the same effect as an increase in water pressure and that a drop in water pressure will have the same effect as an increase in steam pressure. In this connection, it will be noted that each of the toggles includes an extensible link and that the connections between the toggles and their respective Bourdon tubes are adjustable whereby the desired pressure difference may be provided for and the sensitiveness of the contact devices to variations in pressure may be adjusted at will between relatively wide limits.

The contacts 13 and 14 are carried on a support 20 oscillatable about a pivot 20ª, said support tending through friction to remain in any position to which it is moved. Thus when either of the contacts is engaged by the element 12 it is free to move with said element while on the other hand the element 12 may by a relatively slight reverse movement be disengaged from said contact regardless of the degree of prior movement of said element. This obviously enables use of the contact device to effect operation of the valve adjusting motor in one direction or the other to compensate for variation in steam pressure or water pressure, as the case may be, to maintain the desired pressure difference and further to effect interruption of the motor circuit with a minimum degree of over regulation. As will be understood the desirability of connecting the contact element to the water gauge is due to the fact that the volume of water being used in the boiler and the load cause the water pressure to vary somewhat.

The contact device described controls the valve adjusting motor 9 through the medium of electroresponsive reversing switches 21 and 22. The element 12 when in engagement with contact 13 completes circuit from line L' by conductor 23 through a limit switch 24 by conductor 25 through the operating winding of switch 21 by conductor 26 through said contacts 13 and 12 by conductor 27 to line L². On the other hand element 12 when in engagement with contact 14 completes circuit from line L' by conductor 23 through limit switch 28 by conductor 29 through the operating winding of switch 22 by conductor 30 through said contacts 14 and 12 to line L². Thus assuming switch 21 to start the motor 9 in a direction for valve closing such operation will result from an increase in water pressure without a corresponding increase in steam pressure and assuming switch 22 to start the motor for valve opening such operation will result from an increase in steam pressure without a corresponding increase in water pressure, these being the operations desired. As will be understood, the limit switches function only to stop the motor at the open and closed limits of the valve.

The switch 21 when closed completes the motor circuit from line L' through the series field winding $f$ of said motor by conductor 31 through the left hand pole of switch 21 by conductor 32 through the winding of electromagnet 6 by conductor 33 through the armature $a$ of the motor from left to right by conductors 34 and 35 through the right hand pole of switch 21 to line L². On the other hand, switch 22 completes circuit from conductor 31 through the left hand pole of said switch by conductor 34 through the motor armature from right to left by conductor 33 through electromagnet 6 by conductor 32 through the right hand pole of switch 22 to line L², thus providing for reversal of the motor.

While the electromagnet 6 is shown as connected in series with the motor it is of course to be understood that the same may be controlled in any other preferred manner as by shunt connections under the control of the gauge to effect its energization upon completion of the motor circuit and its deenergization upon interruption of the motor circuit.

Figure 2:
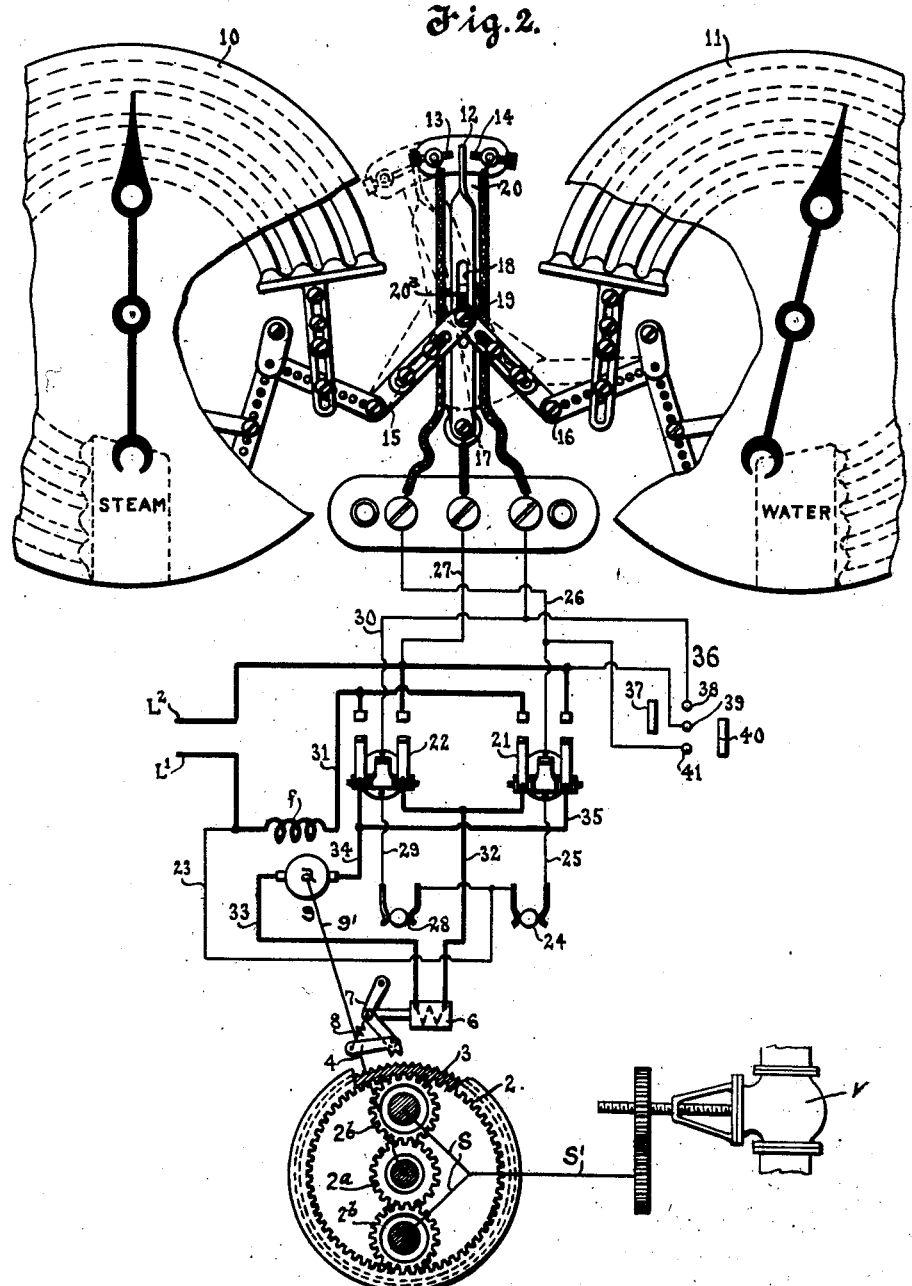
Figure 2 is a more or less diagrammatic view showing the system of electric control.

In practice it is desirable to provide an emergency controller for the valve adjusting motor whereby the latter may be controlled at will and such a controller 36 is shown in Fig. 2. This controller which is diagrammatically illustrated as of the drum type has a contact segment 37 to be engaged with contacts 38 and 39 to shunt the gauge contacts 14 and 12 and with segment 40 to engage contacts 39 and 41 to shunt the gauge contacts 13 and 12 whereby the motor 9 may be operated at will in either direction.

What I claim as new and desire to secure by Letters Patent is:

1. In a system of pressure regulation of water feed to steam boilers, in combination, a valve through which the water is fed, a motor driven adjusting mechanism for said valve and means including a Bourdon tube gauge to control said mechanism automatically to maintain through the medium of said valve a substantially constant pressure difference between the water and steam.

2. In a system of pressure regulation of water feed to steam boilers, in combination, a valve through which the water is fed, a motor driven adjusting mechanism for said valve and means including separate devices respectively responsive to variations in the steam and water pressures to control said valve through the medium of said mechanism to maintain the water pressure in excess of the steam pressure to a given degree.

3. In a system of pressure regulation of water feed to steam boilers, in combination, a valve through which the water is fed and automatic control means for said valve to maintain the water pressure in excess of the steam pressure to a given degree, said means including a motor drive for said valve having means to effect instantaneous release of said valve therefrom following each adjustment of said valve.

4. In a system of pressure regulation of water feed to steam boilers, in combination, a valve through which the water is fed, a motor driven adjusting mechanism for said valve including means to release said valve from its driving motor instantaneously upon termination of the supply of power to said motor and automatic means to establish and interrupt a power supply for said motor to maintain the water pressure in excess of the steam pressure to a given degree through the medium of said valve.

5. In a system of pressure regulation of water feed to steam boilers, in combination, a valve through which the water is fed, a motor driven adjusting mechanism for said valve including means to release said valve from its driving motor instantaneously upon termination of the supply of power to said motor and means sensitive to variations in both the steam and water pressures to effect establishment and interruption of the power supply of said motor for maintaining through the medium of said valve a given excess of water pressure over steam pressure.

6. In a system of pressure regulation of water feed to steam boilers, in combination, a valve through which the water is fed, a motor driven adjusting mechanism for said valve including means to release said valve from its driving motor upon termination of the supply of power to said motor and power controlling means for said motor including gauges respectively subjected to water pressure and steam pressure and a switch operatively connected to both gauges to direct starting of said motor in opposite directions selectively and stopping thereof to maintain through the medium of said valve a water pressure in excess of the steam pressure to a given degree.

7. In a system of pressure regulation of water feed to steam boilers, in combination, a valve through which the water is fed, a motor driven adjusting mechanism for said valve including means to release said valve from its driving motor upon termination of the supply of power to said motor and power controlling means for said motor to effect operations thereof to maintain a water pressure exceeding to a given degree the steam pressure, said controlling means including gauges respectively subjected to water pressure and steam pressure, a switch to direct starting of said motor in opposite directions selectively and stopping thereof and connections between said switch and said gauges whereby said switch is maintained in a neutral position while the desired difference in pressure obtains subject to operation in one way as the water pressure varies relative to the steam pressure and in another way as the steam pressure varies relative to the water pressure.

8. In a system of pressure regulation of water feed to steam boilers, in combination, a valve through which the water is fed, a motor driven adjusting mechanism for said valve including means to release said valve from its driving motor upon termination of the supply of power to said motor and power controlling means for said motor to effect operations thereof to maintain a water pressure exceeding to a given degree the steam pressure, said controlling means including a switch movable in opposite directions from a neutral position to varying degrees to effect starting of the motor in opposite directions selectively subject to stopping upon initial reverse movement of said switch and means subjecting said switch to control by both the steam pressure and the water pressure.

9. In a system of pressure regulation of water feed to steam boilers, in combination, a valve through which the water is fed, a motor driven adjusting mechanism for said valve including means to release said valve from its driving motor upon termination of the supply of power to said motor and power controlling means for said motor to effect operations thereof to maintain a water pressure exceeding to a given degree the steam pressure, said controlling means including a switch movable in opposite directions from a neutral position to varying degrees to effect starting of said motor in opposite directions selectively subject to stopping upon initial reverse movement of said switch, pressure gauges respectively subjected to the steam and water pressures and operative connections between said switch and gauges to maintain said switch in neutral position while the desired difference in pressures prevails and to move said switch in one direction from neutral position upon a variation of the water pressure relative to the steam pressure and in a reverse direction upon a variation of steam pressure relative to the water pressure.

10. In a system of fluid pressure regulation, in combination, a fluid pressure regulating valve, a motor drive for said valve including means to effect instantaneous release of said valve from said drive in any desired position of the former and control means for said drive comprising a Bourdon tube pressure gauge having a contact actuated thereby.

11. In a system of fluid pressure regulation, in combination, a fluid pressure regulating valve, a motor drive for said valve including means to effect instantaneous release of said valve from said drive in any desired position of the former and control means for said drive comprising contacts and a plurality of Bourdon tube pressure gauges, each to actuate certain of said contacts whereby said drive is controlled by said pressure gauges jointly.

12. In a system of fluid pressure regulation, in combination, a fluid pressure regulating valve, a motor drive for said valve including means to effect instantaneous release of said valve from said drive in any desired position of the former and control means for said drive comprising co-operating contacts one of which is movable in opposite directions to engage other of the same selectively and a plurality of Bourdon tube pressure gauges subjected to different pressures and operatively connected to said movable contact to operate the same in response to variations in the relation of the aforementioned pressures.

In witness whereof, I have hereunto subscribed my name.

WALTER L. OSWALD.